(12) United States Patent
Pasko et al.

(10) Patent No.: US 11,017,161 B2
(45) Date of Patent: *May 25, 2021

(54) IMAGE ANNOTATION PROCESS

(71) Applicant: Google LLC, Mountain View, CA (US)

(72) Inventors: Stanislaw Pasko, Warsaw (PL); Michal Brzozowski, Cracow (PL); Wiktor Gworek, Cracow (PL); Zachary Yeskel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,946

(22) Filed: Jul. 31, 2017

(65) Prior Publication Data

US 2017/0329758 A1 Nov. 16, 2017

Related U.S. Application Data

(63) Continuation of application No. 13/617,618, filed on Sep. 14, 2012, now Pat. No. 9,720,894.

(51) Int. Cl.
*G06F 40/169* (2020.01)
*G06F 40/166* (2020.01)
*G06T 11/60* (2006.01)
*G06F 16/44* (2019.01)

(52) U.S. Cl.
CPC ............ *G06F 40/169* (2020.01); *G06F 16/44* (2019.01); *G06F 40/166* (2020.01); *G06T 11/60* (2013.01)

(58) Field of Classification Search
CPC .. G06F 17/24; G06F 17/241; G06F 17/30058; G06F 16/44; G06F 40/166; G06F 40/169; G06F 16/2372; G06T 11/60
See application file for complete search history.

(56) References Cited

U.S. PATENT DOCUMENTS

| | | | |
|---|---|---|---|
| 6,601,057 B1 * | 7/2003 | Underwood | ............ G06F 17/21 707/770 |
| 2002/0012134 A1 | 1/2002 | Calaway | |
| 2004/0239699 A1 | 12/2004 | Uyttendaele et al. | |
| 2006/0265394 A1 * | 11/2006 | Raman | ................ G06F 16/9535 |
| 2007/0067830 A1 | 3/2007 | Kuo et al. | |

(Continued)

OTHER PUBLICATIONS

Vondrick et al., "Efficiently Scaling Up Crowdsourced Video Annotation", Mar. 8, 2012, International Journal of Computer Vision, pp. 23 (Year: 2012).*

(Continued)

*Primary Examiner* — Chau T Nguyen
(74) *Attorney, Agent, or Firm* — Byrne Poh LLP

(57) ABSTRACT

A computer-implemented method, computer program product, and computing system for rendering an annotatable image within an image viewer. An indication of an intent to annotate the annotatable image is received from a user. A meme generation interface is rendered with respect to the annotatable image. Meme annotation criteria is received from the user via the meme generation interface. The meme annotation criteria includes one or more of: a meme message, a meme position indicator, and a font type identifier. The annotatable image is modified based, at least in part, upon the meme annotation criteria, thus generating an annotated image. The annotated image is published to a meme publication website.

15 Claims, 4 Drawing Sheets

(56) References Cited

U.S. PATENT DOCUMENTS

| | | | |
|---|---|---|---|
| 2007/0255785 A1* | 11/2007 | Hayashi | G06F 17/30017 709/204 |
| 2007/0263984 A1* | 11/2007 | Sterner | G11B 27/034 386/234 |
| 2007/0294622 A1* | 12/2007 | Sterner | G06Q 30/00 715/716 |
| 2008/0163317 A1 | 7/2008 | Mills | |
| 2008/0285892 A1 | 11/2008 | Sposato et al. | |
| 2009/0222743 A1 | 9/2009 | Hadfield | |
| 2010/0185733 A1* | 7/2010 | Hon | G06F 17/30029 709/205 |
| 2010/0245294 A1* | 9/2010 | Piersol | G06F 3/0416 345/179 |
| 2011/0032424 A1 | 2/2011 | VanDuyn et al. | |
| 2011/0258526 A1* | 10/2011 | Supakkul | G06F 16/958 715/230 |
| 2011/0314528 A1* | 12/2011 | Dolin | G06Q 50/01 726/7 |
| 2012/0047119 A1* | 2/2012 | Kandekar | G06F 17/30849 707/705 |
| 2012/0054619 A1* | 3/2012 | Spooner | G11B 27/034 715/723 |
| 2012/0102021 A1 | 4/2012 | Hill et al. | |
| 2012/0110432 A1 | 5/2012 | Mei et al. | |
| 2012/0144286 A1* | 6/2012 | Bank | G06F 17/241 715/230 |
| 2012/0150957 A1 | 6/2012 | Bonchi | |
| 2012/0163770 A1 | 6/2012 | Kaiser et al. | |
| 2012/0316998 A1 | 12/2012 | Castineiras et al. | |
| 2012/0324343 A1* | 12/2012 | Cok | G06T 11/60 715/247 |
| 2013/0117655 A1* | 5/2013 | Bennett | G06F 40/169 715/229 |
| 2013/0166507 A1* | 6/2013 | Staczek | G06F 17/30575 707/625 |
| 2013/0177295 A1* | 7/2013 | Cath | H04N 5/44543 386/241 |
| 2013/0322853 A1 | 12/2013 | Oddou et al. | |
| 2014/0075335 A1 | 3/2014 | Hicks et al. | |

OTHER PUBLICATIONS

Duygulu et al., "Associating Video Frames with Text", In Proceedings of the 26th Annual International ACM SIGIR Conference, Toronto, Canada, Jul. 28-Aug. 1, 2003, pp. 1-7.

Goldman et al., "Video Object Annotation, Navigation, and Composition", In Proceedings of the 21st Annual ACM Symposium on User Interface Software and Technology, Monterey, California, USA, Oct. 19-22, 2008, pp. 1-10.

http://www.quickmeme.com/make, "Quickmeme", Quickmeme.com, pp. 1-4, downloaded on May 25, 2012.

http://zipmeme.com/generator, "ZIPMEME", Zipmeme.com, pp. 1-3, downloaded on May 25, 2012.

https://play.google.com/store/apps/details?id=com.zombodroid.MemeGenerator, "Meme Generator", ZomboDroid, pp. 1-2, downloaded on May 25, 2012.

Notice of Allowance dated Apr. 7, 2017 in U.S. Appl. No. 13/617,618.
Office Action dated May 20, 2016 in U.S. Appl. No. 13/617,618.
Office Action dated May 21, 2015 in U.S. Appl. No. 13/617,618.
Office Action dated Nov. 30, 2016 in U.S. Appl. No. 13/617,618.
Office Action dated Dec. 18, 2014 in U.S. Appl. No. 13/617,618.

\* cited by examiner

IMAGE ANNOTATION PROCESS

CROSS-REFERENCE TO RELATED APPLICATION

This application is a continuation of U.S. patent application Ser. No. 13/617,618, filed Sep. 14, 2012, which is hereby incorporated by reference herein in its entirety.

TECHNICAL FIELD

This disclosure relates to annotating images and, more particularly, to the annotation of images to include memes.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

Through the use of such social networks, users may exchange content such as photographs and videos. Further, users may annotate such photographs and videos to include commentary in the form of memes.

SUMMARY

In a first implementation, a computer-implemented method includes rendering an annotatable image within an image viewer. An indication of an intent to annotate the annotatable image is received from a user. A meme generation interface is rendered with respect to the annotatable image. Meme annotation criteria is received from the user via the meme generation interface. The meme annotation criteria includes one or more of: a meme message, a meme position indicator, and a font type identifier. The annotatable image is modified based, at least in part, upon the meme annotation criteria, thus generating an annotated image. The annotated image is published to a meme publication website.

In another implementation, a computer-implemented method includes rendering an annotatable image within an image viewer. An indication of an intent to annotate the annotatable image is received from a user. A meme generation interface is rendered with respect to the annotatable image. Meme annotation criteria is received from the user via the meme generation interface. The annotatable image is modified based, at least in part, upon the meme annotation criteria, thus generating an annotated image.

One or more of the following features may be included. The annotatable image may be a portion of a video. The video may be a flash video stream. The annotatable image may be a still image. The image viewer may be a still image viewer application. The image viewer may be a video viewer application. The meme annotation criteria may include one or more of: a meme message, a meme position indicator, and a font type identifier. The meme generation interface may be configured to allow the user to identify a social network for publishing the annotated image. The annotated image may be published to the identified social network. The annotated image maybe published to a meme publication website. Modifying the annotatable image may include modifying the annotatable image at a later time/date.

In another implementation, a computing system includes a processor and memory configured to perform operations including rendering an annotatable image within an image viewer. An indication of an intent to annotate the annotatable image is received from a user. A meme generation interface is rendered with respect to the annotatable image. Meme annotation criteria is received from the user via the meme generation interface. The annotatable image is modified based, at least in part, upon the meme annotation criteria, thus generating an annotated image.

One or more of the following features may be included. The annotatable image may be a portion of a video. The video may be a flash video stream. The annotatable image may be a still image. The image viewer may be a still image viewer application. The image viewer may be a video viewer application. The meme annotation criteria may include one or more of: a meme message, a meme position indicator, and a font type identifier. The meme generation interface may be configured to allow the user to identify a social network for publishing the annotated image. The annotated image may be published to the identified social network. The annotated image maybe published to a meme publication website. Modifying the annotatable image may include modifying the annotatable image at a later time/date.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE DRAWINGS

Figure 1:
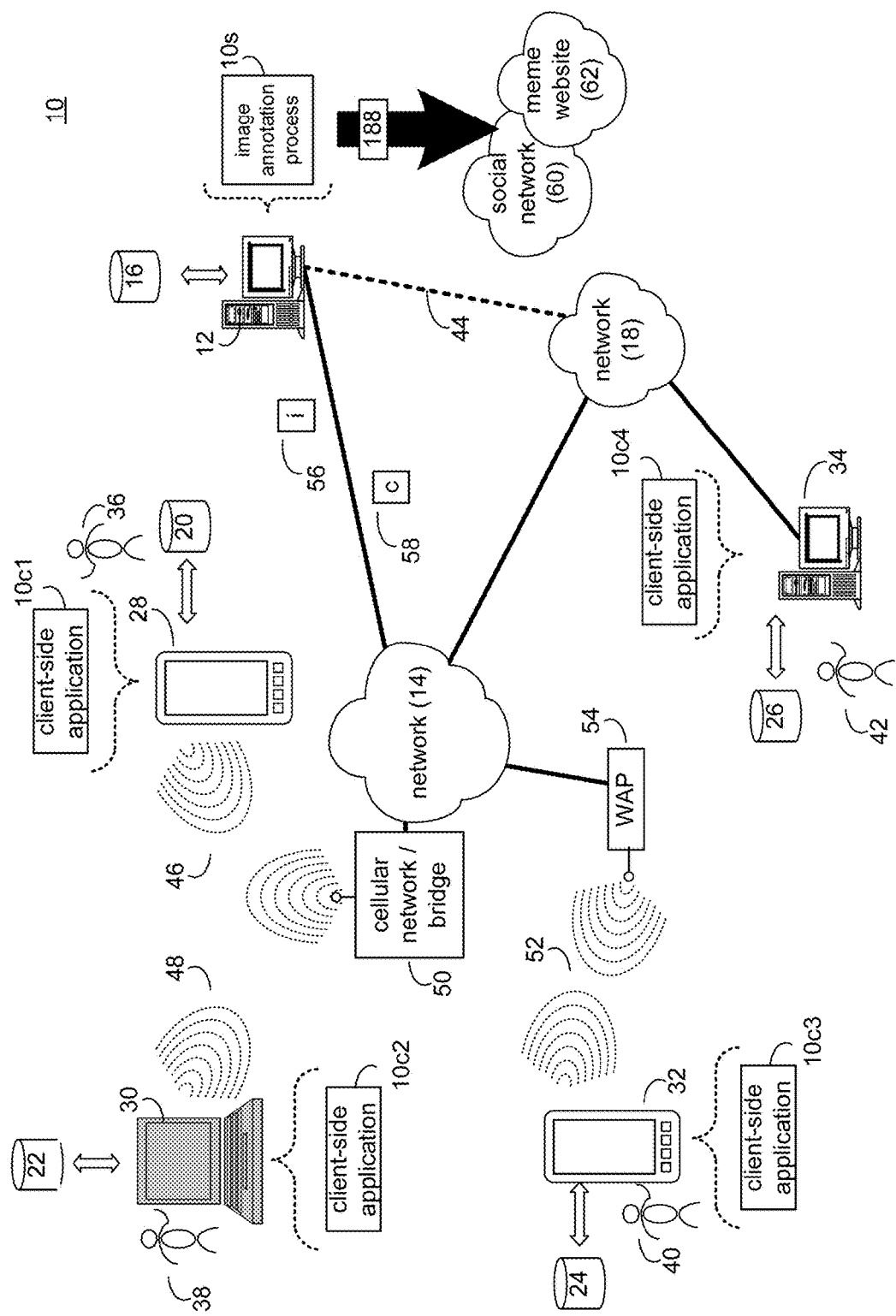
FIG. 1 is a diagrammatic view of a distributed computing network including a computing device that executes an image annotation process according to an implementation of the present disclosure.

Referring to FIG. 1, there is shown image annotation process 10. For the following discussion, it is intended to be understood that image annotation process 10 may be implemented in a variety of ways. For example, image annotation process 10 may be implemented as a server-side process, a client-side process, or a server-side/client-side process.

For example, image annotation process 10 may be implemented as a purely server-side process via image annotation process 10s. Alternatively, image annotation process 10 may be implemented as a purely client-side process via one or more of client-side application 10c1, client-side application 10c2, client-side application 10c3, and client-side application 10c4. Alternatively still, image annotation process 10 may be implemented as a server-side/client-side process via image annotation process 10s in combination with one or more of client-side application 10c1, client-side application 10c2, client-side application 10c3, and client-side application 10c4.

Accordingly, image annotation process 10 as used in this disclosure may include any combination of image annotation process 10s, client-side application 10c1, client-side application 10c2, client-side application 10c3, and client-side application 10c4.

Figure 2:
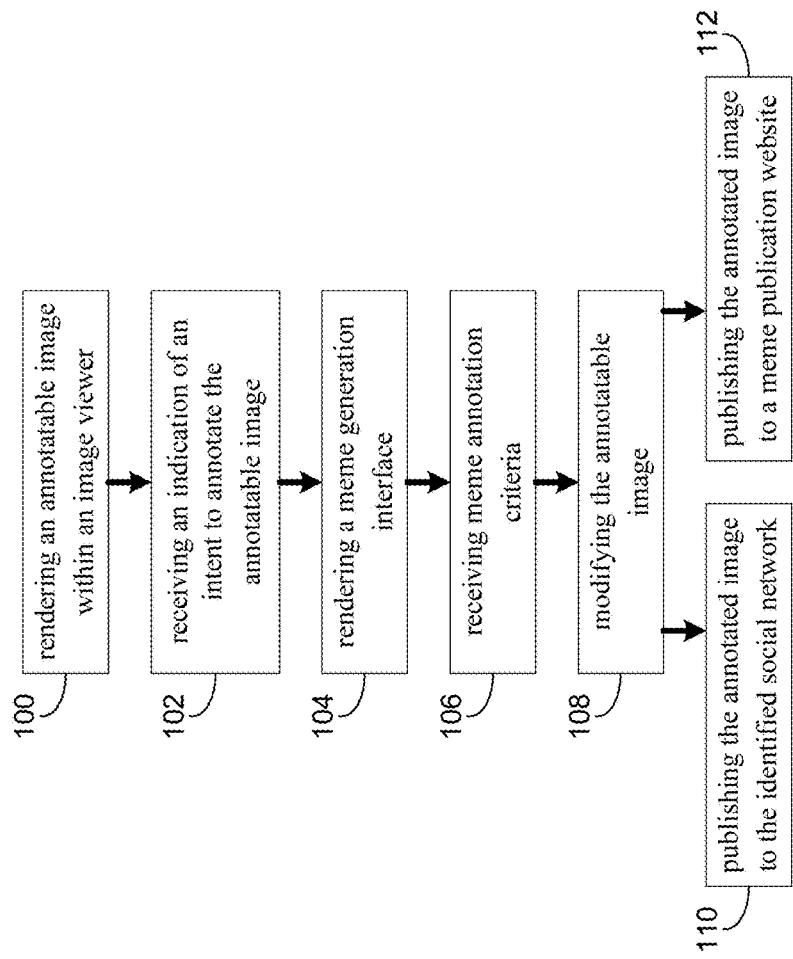
FIG. 2 is a flowchart of the image annotation process of FIG. 1 according to an implementation of the present disclosure.

Referring also to FIG. 2 and as will be discussed below in greater detail, image annotation process 10 may render 100 an annotatable image within an image viewer. An indication of an intent to annotate the annotatable image may be received 102 from a user. A meme generation interface may be rendered 104 with respect to the annotatable image. Meme annotation criteria may be received 106 from the user via the meme generation interface. The meme annotation criteria may include one or more of: a meme message, a meme position indicator, and a font type identifier. The annotatable image may be modified 108 based, at least in part, upon the meme annotation criteria, thus generating an annotated image. The annotated image may be published 110 to a meme publication website Image annotation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of image annotation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a smartphone (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access image annotation process 10 directly through network 14 or through secondary network 18. Further, image annotation process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

Figure 3:
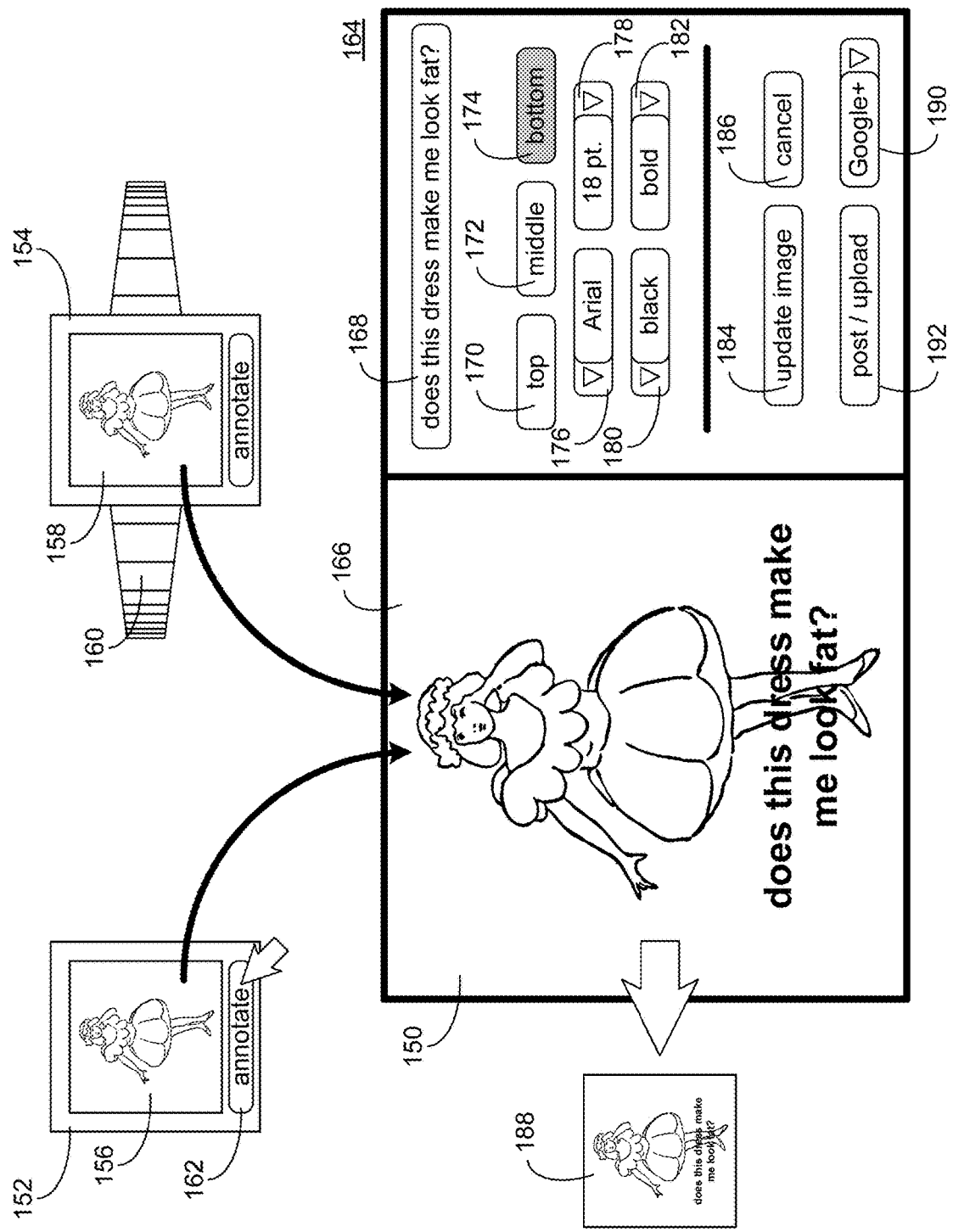
FIG. 3 is a diagrammatic view of a meme generation interface rendered by the image annotation process of FIG. 1 according to an implementation of the present disclosure.

Referring also to FIG. 3, image annotation process 10 may render 100 an annotatable image (e.g., annotatable image 150) within an image viewer (e.g., still image viewer application 152 and/or video viewer application 154). Examples of such an annotatable image may include but are not limited to still image 156 or a portion (e.g., frame 158) of video 160 (such as a Flash™ or YouTube™ video stream).

Accordingly, assume for illustrative purposes that user 38 is watching videos (e.g., video 160 via video viewer application 154) and reviewing still images (e.g., still image 156 via still image viewer application 152), which are rendered 100 on laptop computer 30 by image annotation process 10. Further, assume that upon seeing still image 156, user 38 wishes to annotate image 156. Accordingly, user 38 may select e.g., annotate button 162 (via an onscreen pointer controllable by e.g., a mouse; not shown) that is rendered within still image viewer application 152 by image annotation process 10.

While still image viewer application 152 is described above as including annotate button 162, this is for illustrative purposes only and is not intended to be a limitation of this disclosure as other configurations are possible and are considered to be within the scope of this disclosure. Further, while still image viewer application 152 is described above as being utilized by user 38 to select an image for annotation, this is for illustrative purposes only and is not intended to be a limitation of this disclosure as other configurations are possible and are considered to be within the scope of this disclosure. For example and as described above, a portion (e.g., frame 158) of video 160 (such as a Flash™ or YouTube™ video stream) may be selected for annotation.

Upon selecting annotate button 162, indication 56 (i.e., an indication of an intent to annotate annotatable image 150 from e.g., user 38) may be provided from e.g., laptop computer 30 to image annotation process 10. Upon image annotation process 10 receiving 102 indication 56, image annotation process 10 may render 104 meme generation interface 164 with respect to annotatable image 150. Accordingly, meme generation interface 164 may include image viewing field 166, meme message field 168, meme position indicator buttons 170, 172, 174, meme font selector field 176, meme font size field 178, meme font color field 180, and meme font type field 182.

Accordingly and through the use of meme generation interface 164, user 30 may enter a meme message for inclusion within an attainable image 150. For example, user 30 may enter the meme message "does this dress make me look fat?" into meme message field 168. Further, through the use of meme position indicator buttons 170, 172, 174, user 30 may select the location of the new message within annotatable image 150 as "top" via button 170, "middle" via button 172, and "bottom" via button 174. Additionally, through the use of meme font selector field 176, meme font size field 178, meme font color field 180, and meme font type field 182, user 30 may select the font (e.g., Time New Roman, Arial), font size (e.g., 12 point, 14 point), font color (e.g., black, red), and font type (e.g., italics, bold, underlined). Once properly annotated, user 30 may select "update image" button 184 using the on-screen pointer. Alternatively, user 30 may select "cancel" button 186 if they do not wish to make any changes to annotatable image 150.

Upon selecting "update image" button 184, meme annotation criteria 58 may be provided from e.g. laptop computer 30 to image annotation process 10. Meme annotation criteria 58 may include one or more of: a meme message (e.g., "does this dress make me look fat?"), a meme position indicator (e.g., bottom), a font type identifier (e.g., Arial), a font size (e.g., 14 point), a font color (e.g., black), and a font type (e.g., bold).

Upon image annotation process 10 receiving 106 meme annotation criteria 58 from user 38 via meme generation interface 164, image annotation process 10 may modify 108 annotatable image 150 based, at least in part, upon meme annotation criteria 58, thus generating annotated image 188.

Meme generation interface 164 may be configured to allow user 38 to identify a social network (e.g., social network 60) for publishing 110 annotated image 188. For example, user 38 may select the desired social network (e.g., Google+™, Facebook™, Twitter™) via dropdown menu 190 and, once the appropriate social network is selected, user 38 may select (via the on-screen pointer) "post/upload" button 192 to effectuate the publishing 110 of annotated image 188 to the selected social network. Upon selecting "post/upload" button 192, user 38 may be prompted to provide username and password information for the selected social network.

Additionally, meme generation interface 164 may be configured to allow user 38 to identify a meme publication website (e.g., meme website 62) for publishing 112 annotated image 188. For example, user 38 may select the desired meme publication website (e.g., Memestache™, KnowYourMeme™) via dropdown menu 190 and, once the appropriate meme publication website is selected, user 38 may select (via the on-screen pointer) "post/upload" button 192 to effectuate the publishing 112 of annotated image 188 to the selected meme publication website. Upon selecting "post/upload" button 192, user 38 may be prompted to provide username and password information for the selected meme publication website.

As discussed above, upon selecting "update image" button 184, meme annotation criteria 58 may be provided from e.g. laptop computer 30 to image annotation process 10. Upon image annotation process 10 receiving 106 meme annotation criteria 58 from user 38 via meme generation interface 164, image annotation process 10 may modify 108 annotatable image 150 based, at least in part, upon meme annotation criteria 58, thus generating annotated image 188. Image annotation process 10 may be configured so that modifying 108 annotatable image 150 may occur at a later time/date. For example, image annotation process 10 may be configured so that meme annotation criteria 58 is stored for processing (and subsequent image annotation) at a later date, thus allowing for e.g., the offline generation of meme annotation criteria 58 which may subsequently be processed when e.g., laptop computer 30 is subsequently online.

Figure 4:
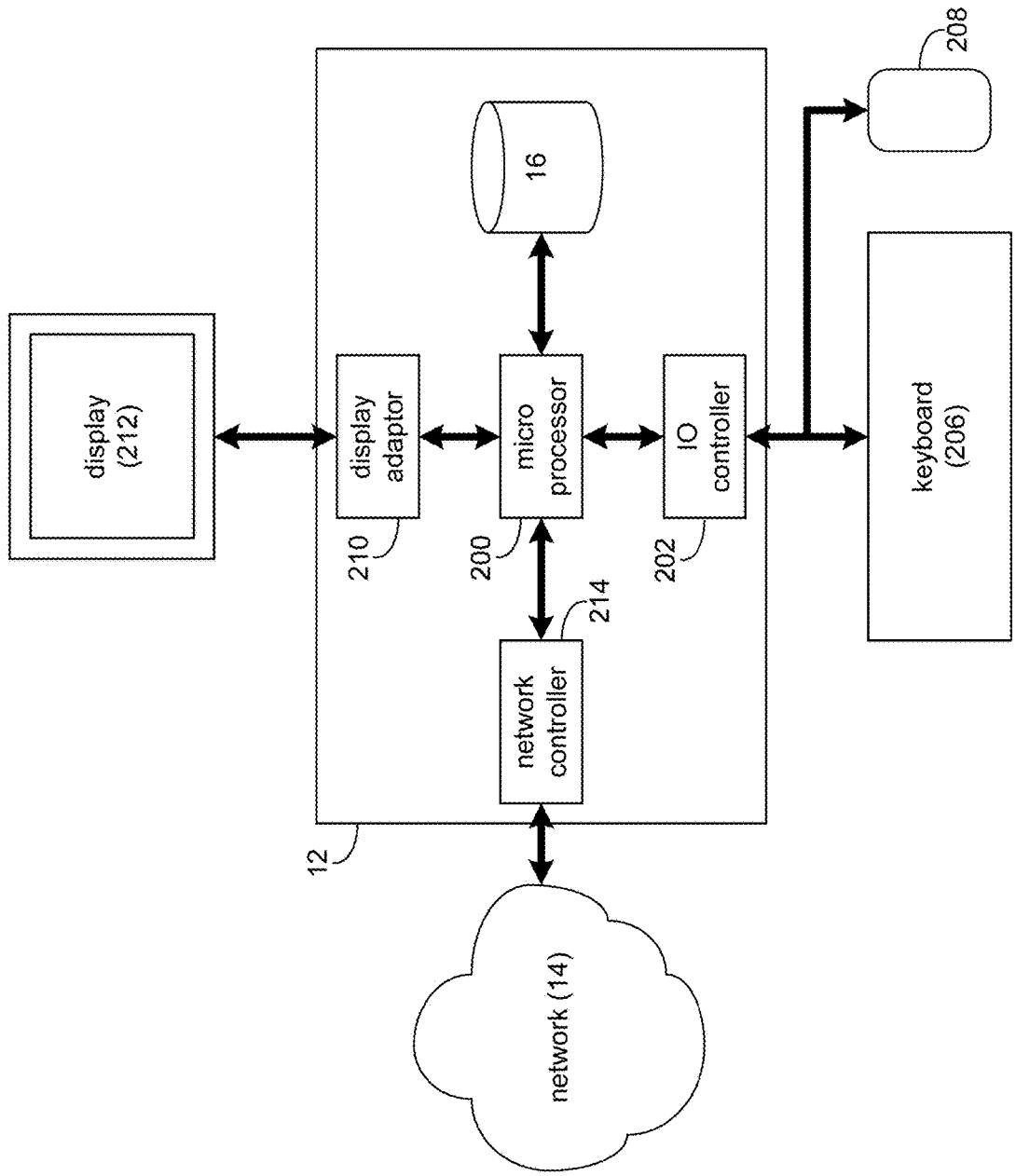
FIG. 4 is a diagrammatic view of the computing device of FIG. 1 according to an implementation of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, image annotation process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for image annotation process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method for annotating images, comprising:
receiving, from a user device, a selection of a portion of a video;
in response to receiving the selection of the portion of the video, rendering an annotation interface on the user device, wherein the annotation interface includes a text box for receiving a message, and a plurality of selectable inputs for indicating a position at which the message is to be presented on an image corresponding to the portion of the video and for updating the image corresponding to the portion of the video;
in response to receiving a selection to update the image corresponding to the portion of the video from the plurality of selectable input and prior to modifying the selection of the portion of the video, receiving, at a first time, annotation criteria via the annotation interface, wherein the annotation criteria includes the message and the position;

determining whether the selection of the portion of the video is to be modified based on the annotation criteria at a later time based on whether the user device is connected to a communication network at a first time;

in response to determining that the selection of the portion of the video is to be modified based on the annotation criteria at the later time based on the user device not being connected to the communication network at the first time, storing the annotation criteria for processing at the later time when the user device is subsequently connected to the communication network;

in response to determining that the user device has connected to the communication network at a second time, processing the stored annotation criteria by generating a modified portion of the video using the stored annotation criteria, wherein the modified portion of the video includes the message superimposed on the image corresponding to the portion of the video; and saving the modified portion of the video.

2. The method of claim 1, wherein the annotation criteria includes a font type.

3. The method of claim 1, further comprising causing the modified portion of the video to be presented on a second user device.

4. The method of claim 3, wherein the modified portion of the video is presented on the second user device in response to receiving an input from the first user device.

5. The method of claim 3, wherein the modified portion of the video is presented on the second user device within a page associated with a social networking service.

6. A system for annotating images, the system comprising:
a hardware processor that is programmed to:
receive, from a user device, a selection of a portion of a video;
in response to receiving the selection of the portion of the video, render an annotation interface on the user device, wherein the annotation interface includes a text box for receiving a message, and a plurality of selectable inputs for indicating a position at which the message is to be presented on an image corresponding to the portion of the video and for updating the image corresponding to the portion of the video;
in response to receiving a selection to update the image corresponding to the portion of the video from the plurality of selectable input and prior to modifying the selection of the portion of the video, receive, at a first time, annotation criteria via the annotation interface, wherein the annotation criteria includes the message and the position;
determine whether the selection of the portion of the video is to be modified based on the annotation criteria at a later time based on whether the user device is connected to a communication network at a first time;
in response to determining that the selection of the portion of the video is to be modified based on the annotation criteria at the later time based on the user device not being connected to the communication network at the first time, store the annotation criteria for processing at the later time when the user device is subsequently connected to the communication network;
in response to determining that the user device has connected to the communication network at a second time, process the stored annotation criteria by generating a modified portion of the video using the stored annotation criteria, wherein the modified portion of the video includes the message superimposed on the image corresponding to the portion of the video; and
save the modified portion of the video.

7. The system of claim 6, wherein the annotation criteria includes a font type.

8. The system of claim 6, wherein the hardware processor is further programmed to cause the modified portion of the video to be presented on a second user device.

9. The system of claim 8, wherein the modified portion of the video is presented on the second user device in response to receiving an input from the first user device.

10. The system of claim 8, wherein the modified portion of the video is presented on the second user device within a page associated with a social networking service.

11. A non-transitory computer-readable medium containing computer executable instructions that, when executed by a processor, cause the processor to perform a method for annotating images, the method comprising:
receiving, from a user device, a selection of a portion of a video;
in response to receiving the selection of the portion of the video, rendering an annotation interface on the user device, wherein the annotation interface includes a text box for receiving a message, and a plurality of selectable inputs for indicating a position at which the message is to be presented on an image corresponding to the portion of the video and for updating the image corresponding to the portion of the video;
in response to receiving a selection to update the image corresponding to the portion of the video from the plurality of selectable input and prior to modifying the selection of the portion of the video, receiving, at a first time, annotation criteria via the annotation interface, wherein the annotation criteria includes the message and the position;
determining whether the selection of the portion of the video is to be modified based on the annotation criteria at a later time based on whether the user device is connected to a communication network at a first time;
in response to determining that the selection of the portion of the video is to be modified based on the annotation criteria at the later time based on the user device not being connected to the communication network at the first time, storing the annotation criteria for processing at the later time when the user device is subsequently connected to the communication network;
in response to determining that the user device has connected to the communication network at a second time, processing the stored annotation criteria by generating a modified portion of the video using the stored annotation criteria, wherein the modified portion of the video includes the message superimposed on the image corresponding to the portion of the video; and
saving the modified portion of the video.

12. The non-transitory computer-readable medium of claim 11, wherein the annotation criteria includes a font type.

13. The non-transitory computer-readable medium of claim 11, wherein the method further comprises causing the modified portion of the video to be presented on a second user device.

14. The non-transitory computer-readable medium of claim 13, wherein the modified portion of the video is presented on the second user device in response to receiving an input from the first user device.

15. The non-transitory computer-readable medium of claim 13, wherein the modified portion of the video is presented on the second user device within a page associated with a social networking service.

\* \* \* \* \*